Dec. 16, 1941. O. D. COLLIS ET AL 2,266,005
TREATMENT OF LOOSE MATERIALS
Filed July 31, 1939  5 Sheets-Sheet 5

Patented Dec. 16, 1941

2,266,005

UNITED STATES PATENT OFFICE 2,266,005

TREATMENT OF LOOSE MATERIALS

Oliver D. Collis, Eldred C. Brace, and Emery O. Thompson, Clinton, Iowa, assignors to The Collis Company, Clinton, Iowa, a corporation of Iowa Application July 31, 1939, Serial No. 287,476

20 Claims. (Cl. 263—22)

The apparatus of our invention which is adaptable for the heat treatment of various loose materials, such for example as the roasting of raw ores, is essentially a circular rotary hearth furnace in which the hearth rotates in an annular tunnel constructed of insulating material. The advantages and objects of the present furnace are many. Among others, there is (1) conservation of space; (2) a positive forward movement of every particle of the ore; (3) controlled speed of the hearth movement, resulting in a definite timing of the heat-exposure period; (4) zoning of the furnace, with each of the zones controlled; (5) positive control and elimination of products of combustion and chemical formation; and (6) reduction of dust to a minimum. These various objects and advantages, as well as others which will be hereinafter noted, may be realized from our invention of which a suggestive embodiment is illustrated in the accompanying drawings in the manner following:

In the description to follow we will discuss in order (1) the annular hearth; (2) the annular roof; (3) the rabble mechanism; (4) the feeding mechanism; and (5) certain miscellaneous details of the construction.

While reference throughout the specification is made to an ore roaster, as a specific application of our invention, it should be understood that it may be applied to the heat treatment of any loose materials under controlled conditions, or simply to the heating, or even the drying (with or without heat) of such materials, as a continuous process wherein the material, while disposed upon a hearth, is subjected to repeated stirring, turning over, and exposure of fresh portions of its mass, during the treating period, and (optionally) previous and subsequent thereto.

The annular hearth

Figures 1, 16:
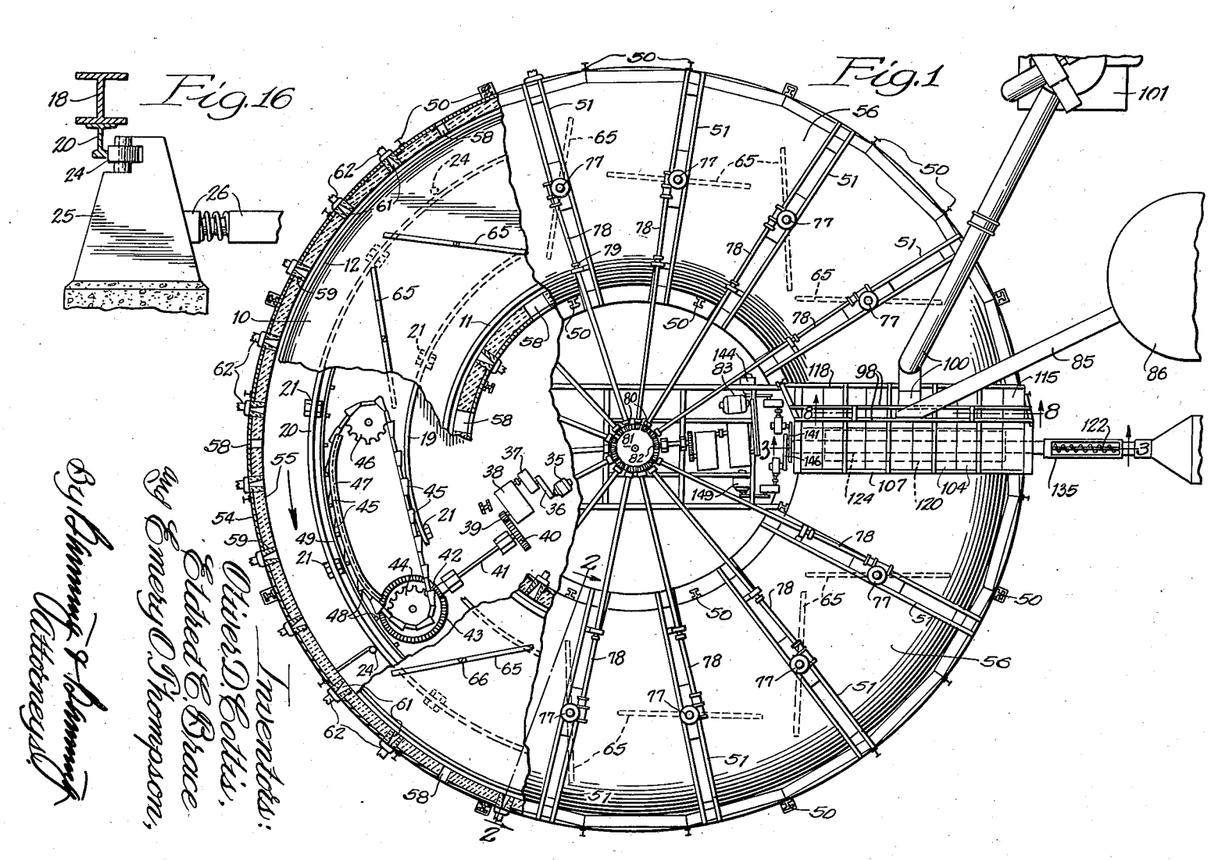
Figure 1 is a plan view of the apparatus in its entirety with a portion of the roof broken away to exhibit the rotary hearth therebelow, a portion of the latter being also broken away to exhibit the driving mechanism therefor.
Fig. 16 is an enlarged detail in section through one of the circular beams and associated track beneath the hearth, showing in elevation one of the thrust rollers and mounting therefor.
Figure 2:
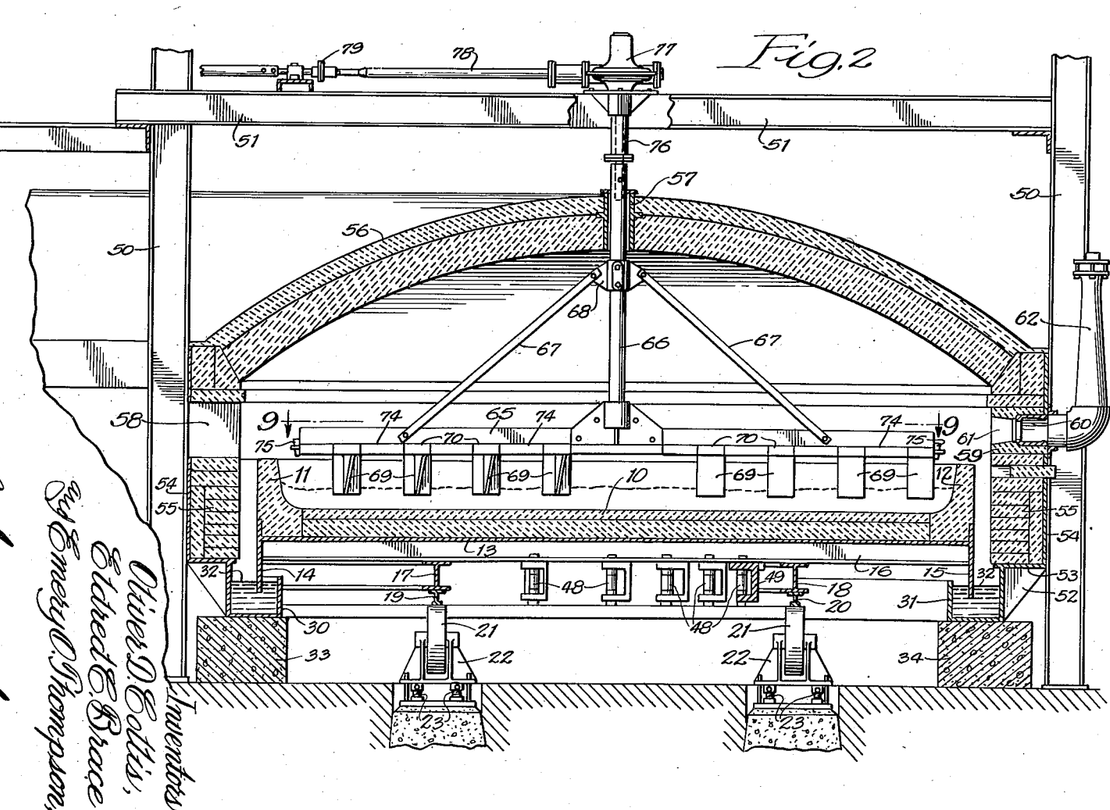
Fig. 2 is a transverse section, on an enlarged scale, through the hearth and roof therefor, taken on line 2—2 of Fig. 1.

Referring particularly to Figs. 1 and 2, the annular hearth comprises a ring-shaped floor 10 bordered adjacent its inner and outer rims by low walls 11 and 12, respectively, all desirably produced from suitable refractory materials, and carried upon a metallic base plate 13 from which depend aprons 14 and 15 adjacent the inner and outer walls, respectively. The hearth base plate is supported upon and reinforced by cross beams 16 which are rested upon inner and outer circular beams 17 and 18, respectively. Circular flanged tracks 19 and 20 are fitted to the underside of the inner and outer circular beams 17 and 18, respectively, each track being adapted to ride upon the upper face of a plurality of rollers 21. As shown, each roller is mounted upon a pedestal 22 whose base is desirably rested upon adjustable supports such for example as the jacks 23 which are shown in Fig. 2. To assure rotation of the hearth about a fixed axis we may employ a plurality of thrust rollers 24 (four, spaced 90° apart, being the suggested number), each rotatably carried upon a support 25 (see Fig. 16) in position to engage a flange of the circular track 20, a lateral yielding brace 26 being associated with each support, if desired. As indicative of the number of rollers that may be employed for support of the hearth, we would suggest eight below the inner track and twelve below the outer track, making twenty altogether. The depending aprons 14 and 15 are positioned within circular troughs 30 and 31, respectively, containing a suitable fluid material (water, sand, et al.) to a level 32 which is above the lower edge of the apron, whereby to provide a seal therewith. Each trough is supported upon a plurality of circularly arranged piers, the inner ones being designated as 33 and the outer ones as 34, the space between these piers and below the hearth being open or closed according as may be desired.

A drive for the turntable may be provided as by a motor 35 operating through a chain 36 which, through reduction gearing contained within housings 37 and 38, operates a pinion 39 in mesh with the gear 40 at one end of a shaft 41 which is disposed in a generally radial direction. At the outer end of the shaft is carried a beveled gear 42 in mesh with a ring gear 43 having a fast connection with a sprocket wheel 44 around which is extended a chain having alternate ratchet links 45. This chain passes around an idler sprocket wheel 46, one run of the links between the two sprocket wheels being extended through a channeled guide 47 adjacent pins 48 which are mounted equidistantly upon a circular support 49 so as to receive engagement from the ratchet links of the chain. In this manner, upon operation of the motor, a very slow movement will be imparted to the chain so that the hearth will be revolved at a corresponding speed upon the several wheels whereon the rails are adapted to travel.

The annular roof

Extended vertically from suitable foundations to the outside of the piers 33 and 34, are supporting beams 50, spaced at suitable intervals and interconnected with each other and certain radially extending overhead beams 51. The vertical beams support an annular roof which surmounts the hearth in spaced relation thereto. As shown, the troughs 30 and 31 are each formed with an outwardly extended bracket 52 supporting a ledge 53 from which rises a retaining plate 54 connected at intervals with the vertical supports 50 so as to be sustained thereby. Built upon each ledge and extending upwardly along the inner face of each retaining plate is a wall 55 supporting at its upper end the opposite edges of an arched annular roof 56, the walls 55 and the roof supported thereon being desirably made, in whole or in part, of a suitable refractory material. Through the center of the roof, adjacent each connecting beam 51, is a sleeve 57. Also we provide through the inner and outer walls 55 a plurality of draft openings 58, positioned, if desired, so that their lower edges are about opposite the upper edge of the inner low wall 11 of the hearth. Each such opening may be closed, in whole or in part, by a suitable door (not shown). Through the outer wall 55 is an opening with a surrounding lining 59 of refractory material, a burner 60 being fitted into such opening where it is surrounded by the refractory material through which is a central passageway 61 forming a discharge orifice for flames which are projected from the burner into the annular space between the hearth and roof. The burner is connected with a conduit 62 leading to a source of fuel supply, preferably oil or gas. It will be understood that a number of such burners are located adjacent an outer wall of the annular hearth, the positioning and spacing of such burners being preferably according to some such plan as will hereinafter be explained.

The rabble mechanism

Figures 7, 8, 9, 10:
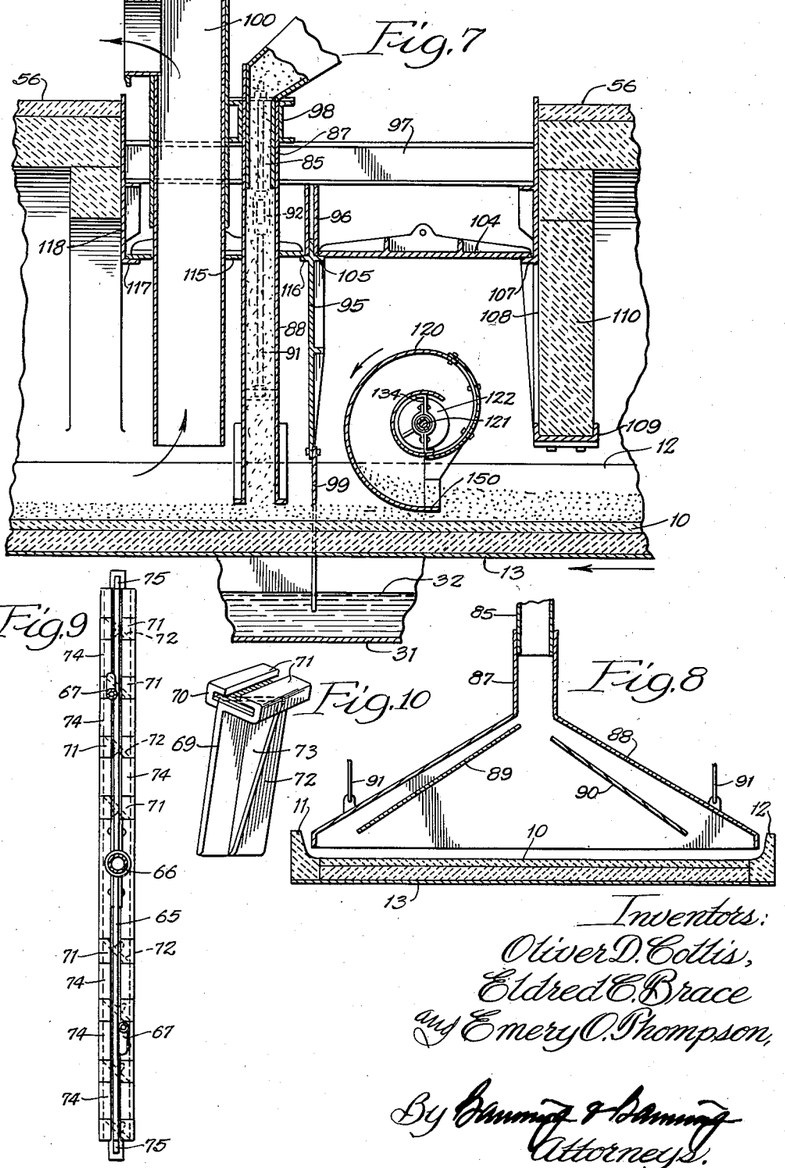
Fig. 7 is a transverse section, on an enlarged scale, taken on line 7—7 of Fig. 3.
Fig. 8 is a detail in section, on an enlarged scale, taken on line 8—8 of Fig. 1.
Fig. 9 is a view in section, taken on line 9—9 of Fig. 2, showing the top plan of one of the rabble arms.
Fig. 10 is a view in perspective of one of the rabble plows.

At various points, preferably at equal distances apart, we have arranged rabbles over the annular hearth for the purpose of stirring and shifting the material to be treated which lies in a relatively thin layer upon the floor thereof. Each rabble comprises an arm 65 in the form of an inverted T-iron, supported fast at its midpoint upon the lower end of a shaft 66, other supporting braces 67 being extended from points toward opposite ends of the arm to a bracket 68 which is carried at an elevated point on the shaft, all as best shown in Fig. 2. Slidably supported upon the arm 65 are a plurality of plows 69 each having the general form which is best shown in Fig. 10 where it will be observed we employ a channeled head 70 with inturned flanges 71 adapted to rest upon the opposed flanges of the arm 65 so as to derive support therefrom. A blade 72 which depends from each plow head is braced by a web 73. The blade extends angularly with respect to the supporting arm 65, so that when the plow is mounted thereupon the blade will have a definite pitch in relation thereto. As many plows as may be used to best advantage are mounted on each rabble arm, intermediate spacers 74 being slidingly arranged upon the arm to assure a fixed relationship thereof. When so assembled, keys 75 may be driven into slots at each end of the arm to lock the plows in place.

The elevation of the rabble arm is such that the lower or acting edges of the plows will be maintained off of the floor of the hearth a distance which is best suited for the treatment of the material thereon. The shaft 66 extends upwardly through the sleeve 58 in the annular roof and thence through a bearing 76 which is mounted upon and depends from the overhead beam 51. At the upper end of the shaft is mounted gearing contained within a housing 77 from which a shaft 78 is extended radially toward the center of the annular roof, there being a suitable universal joint 79 interposed therein to compensate for possible misalignment. Each of the radial shafts terminates equidistantly from the center of the apparatus where a beveled gear 80 is fitted thereto in driven relation to a ring gear 81 adapted to be driven by a beveled gear 82 which, through suitable transmission, receives motion from a motor 83. By the means described, the motor 83 will produce a concurrent rotation of all the radial shafts with a consequent simultaneous turning movement of all rabble arms. Inasmuch as the hearth, during operation, will be undergoing a slow continuous revolving motion, it follows that the loose material which is deposited upon the hearth floor will be acted upon by the several rabbles in succession to distribute, move about, and turn over all of the loose material which is placed thereon for treatment by flames, radiant heat or other drying medium.

The feeding mechanism

Inasmuch as the mechanism of our invention is designed for continuous operation, it is necessary that means be provided (1) for feeding to the hearth a constant supply of material to be treated; and (2) for removing from the rotating hearth the material immediately after treatment. The mechanism for this purpose is illustrated in detail in Figs. 4 to 7 inclusive.

By reference to Fig. 1 it will be observed that the radial shafts 78, by which the rabble mechanisms are driven, are spaced apart substantially equidistantly except for one sector which is about twice as wide as the space between any two adjacent radial shafts. In this sector the material is introduced onto and removed from the hearth, most of the space being utilized for the feeding mechanism and for certain parts associated therewith, as will now be described.

Extending radially over the hearth and through the annular roof is a housing through which passes a chute 85 leading downwardly from a bin or hopper 86 wherein is maintained a supply of loose material to be treated. As by means of suitable valve mechanism (not shown) the gravity flow of the material through the chute may be controlled so that it will be deposited upon the hearth continuously at a rate which may be handled to best advantage. As shown, the lower end of the chute is telescopingly fitted into the upper end of a neck 87 extending upwardly from a distributing hood 88 which extends transversely across the hearth, there being baffles 89 and 90 arranged within the hood to deflect and guide a portion of the material to points adjacent the opposite rims of the hearth. The outer baffle 90 is disposed a slightly greater distance from the adjacent wall of the hood than is the inner baffle 89 in relation to the hood wall which is adjacent thereto, thereby assuring a larger flow of material to the hearth adjacent its outer rim where the surface area is somewhat greater, with a more even distribution of the material in consequence. The bottom side of the hood which is open may be positioned close to the floor of the hearth. The hood is adjustably supported as by a pair of bolts 91 (see Figs. 6 and 8) each equipped with a turn buckle 92 by which to vary the height at which the hood is supported—a desirable objective in view of the diversities of the materials and conditions to be dealt with.

Close to the hood is a vertical partition 95 which extends transversely over the hearth, with support furnished thereto as by plate brackets 96 which depend from a beam 97 to which they are connected. Several of such beams, spaced apart as desired at intervals, may be carried by one or more overhead beams 98. To the lower edge of the partition may be secured an apron 99 which fits closely within the hearth, over its rim wall and down therebelow into the fluid troughs 30 and 31 to establish, in effect, a seal therewith. The partition, with depending apron, accordingly divides the annular space above the hearth into a separate zone, the raw material being deposited on the hearth close to one side of the partition and being removed therefrom close to its opposite side after a travel on the hearth of nearly 360°, as will be presently pointed out.

Adjacent the hood and extending upwardly from a point close to the hearth is a conduit 100 which passes out through the housing to a scrubber 101, or directly into a stack, for discharge of gases or products of combustion into the atmosphere. The housing within which the hood and conduit are contained includes also a number of hatches 104, each removable, when desired, to facilitate access to the mechanism therewithin. As best shown in Fig. 7, each hatch may be rested along one edge upon a flange 105 extended outwardly from the partition 95, its opposite edge being rested upon a flange 107 forming part of a channeled beam 108, the opposite ends of this beam being carried by the walls 55 which lie to the inside and outside of the annular hearth. This channeled beam may also aid in supporting a transverse wall 110 forming part of the housing in which the feeding mechanism is contained. By positioning a plurality of hatches each rested upon supporting flanges, we provide between the partition 95 and wall 110 an enclosed space to which access may be readily gained.

Figures 3, 4, 5, 6:
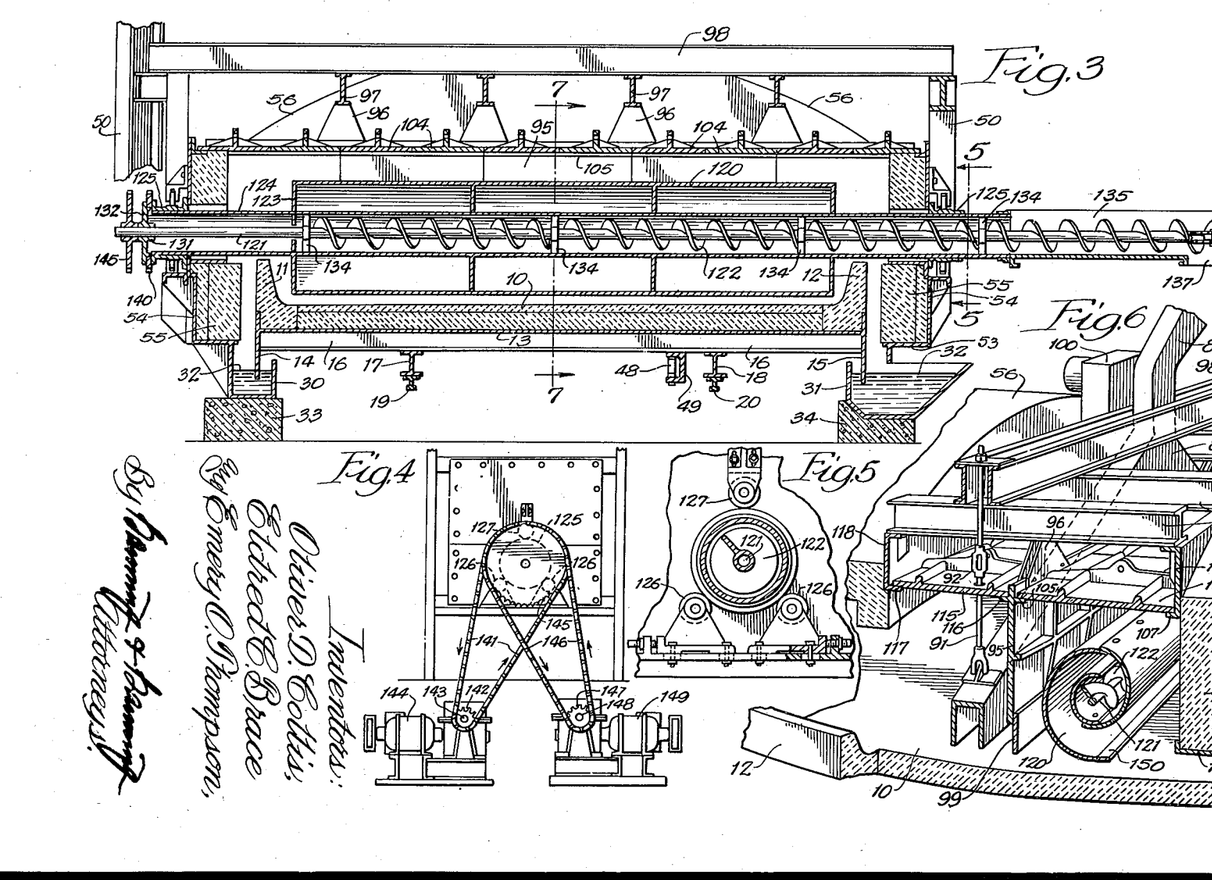
Fig. 3 is a detail in section, on an enlarged scale, taken on line 3—3 of Fig. 1, showing one type of unloading mechanism which may be employed.
Fig. 4 is an end elevational view, showing the drive for the unloading mechanism.
Fig. 5 is a transverse section, taken on line 5—5 of Fig. 3.
Fig. 6 is a sectional perspective view taken in a plane near the outer periphery of the hearth, looking inwardly thereof at the point where the delivery and unloading mechanism is located.

Another set of hatches 115 are similarly positioned upon the opposite side of the partition, each being rested along one edge upon a flange 116 which projects therefrom and along its opposite edge upon a flange 117 forming part of a channeled beam 118 which extends transversely between opposite walls 55, all as shown in Figs. 6 and 7. The hatches 115 are provided with apertures, as needed, for the passage therethrough of the supporting bolts 91, the hood 88, the conduit 100, etc., the several hatches affording a substantial closure over the space therebelow.

Below one set of hatches 104 we have arranged an unloading mechanism which, in the form shown in Figs. 3–7, comprises a spirally formed rotatable scoop 120 containing in its center a rotatable shaft 121 whereon is a spiral blade 122 forming a screw conveyor adapted to receive from the scoop material which is to be moved horizontally therealong. As best shown in Fig. 3, the scoop length is substantially equal to the width of the annular hearth; beyond each opposite end wall 123 of the scoop its inner convolution extends in the form of a tube 124 adapted to fit within a flanged collar 125 which is rotatably supported between a pair of horizontally adjustable lower rollers 126 and a vertically adjustable upper roller 127, thereby affording a vertically adjustable rotatable mounting for the spiral scoop in its entirety (see Fig. 5).

The spiral conveyor shaft 121 is journaled for rotation in a bearing 131 forming part of a head plate 132 which is mounted at the end of the tubular extension 124 which lies to the inner side of the hearth. At its opposite end the shaft is rotatably journaled in a bearing 133 which may be carried upon a suitable support. One or more bridges 134 may be fitted within the inner convolution of the scoop to afford intermediate support for the shaft, the spiral blade being interrupted at such points. Beyond the outer tubular extension of the scoop is a trough 135 with a bottom opening 137 through which the material is discharged.

At the end of the inner tubular extension for the scoop we have affixed a sprocket wheel 140 over which trains a chain 141 (see Fig. 4) which passes around a sprocket wheel 142 affixed to a shaft 143 forming part of a reduction gearing which is adapted to be driven by a motor 144. By some such means rotation may be imparted to the scoop. For operating the conveyor we employ a second sprocket wheel 145 affixed to the inner end of the shaft 121, adapted to be driven by a chain 146 which trains over a sprocket wheel 147 carried fast on a shaft 148 forming part of a reduction mechanism which is adapted to be driven by a motor 149. The direction of rotation of the conveyor is desirably opposite that of the spiral scoop whose outer longitudinal edge, preferably reinforced by a strip 150 of hardened steel (see Fig. 7), swings close to the floor of the hearth so as to pick up the loose material thereon and raise it with a concurrent feeding movement toward the center of the scoop where the rotating spiral conveyor will then advance the material horizontally to its point of discharge.

Certain modifications

Figure 11:
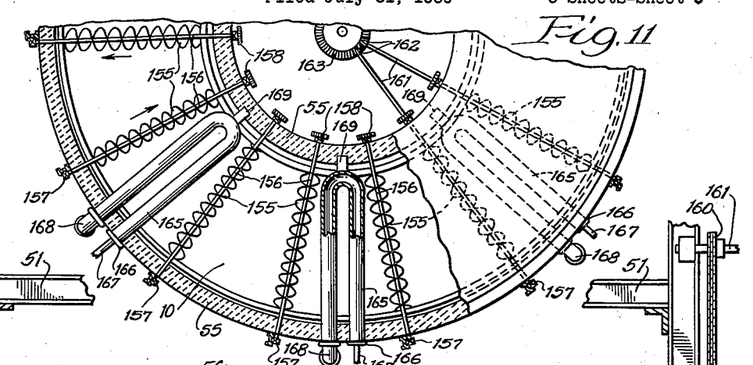
Fig. 11 is a fragmentary top plan view of the annular roof broken away to exhibit a rotating hearth with which is associated a plurality of heating units and rabbles of modified construction.
Figure 12:
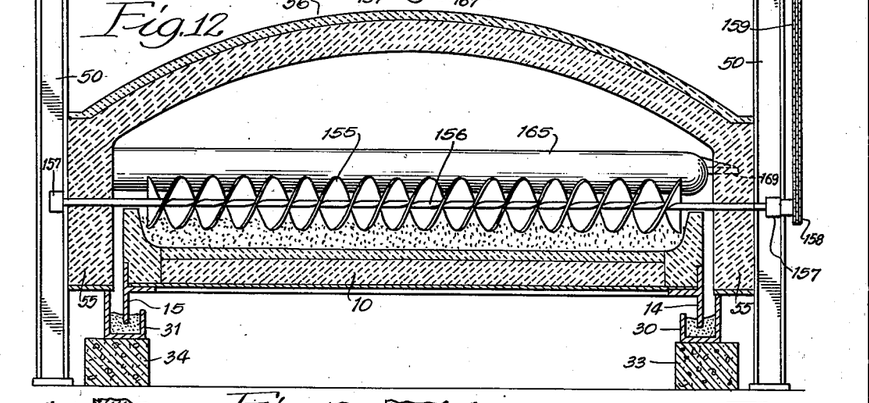
Fig. 12 is a transverse section through the hearth and roof therefor, showing in elevation the type of heating unit and rabble which is illustrated in Fig. 11.

In many details, and also in some of the major units, it is possible to substitute for the constructions heretofore described certain modifications which may even prove to be more satisfactory, depending upon the material to be treated, the conditions of use, etc. One such modification relates to the rabble mechanism; another to the means for delivering heat into the roasting space above the hearth, both illustrated in Figs. 11 and 12; and the others to the unloader mechanism of which one form is illustrated in Figs. 13 and 14, and another form in Fig. 15.

For a rabble mechanism we may employ a plurality of spiral blades 155 (see Figs. 11 and 12) each extending continuously along a shaft 156 which is disposed transversely over the hearth, the blades at their lowermost points lying close to the hearth floor so as to engage with the layer of loose material that rests thereon. Opposite ends of each shaft are journaled for rotation in suitable bearings 157, the shaft being extended beyond the inner bearing to carry a sprocket wheel 158 over which trains a chain 159 which is driven by a sprocket wheel 160 upon an upper shaft 161 extending radially to a point close to the center of the apparatus where a bevel gear 162 fitted thereto meshes with a ring gear 163 adapted to be driven from a source of power (not shown). By such a transmission, a number of spiral blades, each extended transversely across the hearth, may be driven in unison so that the material which is moved along with the hearth is constantly turned over and stirred. The pitch of the blades on alternate rabbles may be reversed so that stirring of the ore is equalized in the directions of its opposite rims.

It is also feasible to apply a radiant heat to the material as by a plurality of tubes 165, each of which lies just above the ore bed on the hearth, being extended across between the opposite walls 55 and then back again so as to present two rims in each of which is burned a fuel which heats the tube to a temperature sufficiently high to subject the adjacent portions of the loose material to the desired treatment. At one end 166 of each tube connection is made with a fuel pipe 167, the opposite tube end having a bend 168 at a point where connection is made to a stack for discharge of products of combustion into the atmosphere. At the point where the return bend occurs the tube is provided with a trunnion 169 adapted to lie within a socket or bearing within the inner wall 55 whereby to furnish support for the tube at that end. According to this arrangement, only the outer wall 55 need be formed with openings for the passage of the two rims of the tube.

Figures 13, 15:
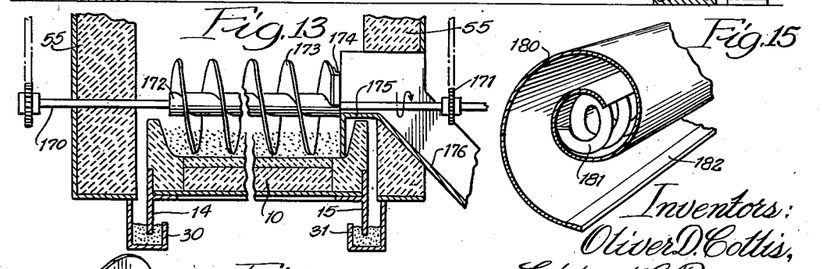
Fig. 13 is a fragmentary detail in section illustrating a modified unloading mechanism.
Fig. 15 is a detail in perspective of still another type of unloading mechanism.
Figure 14:
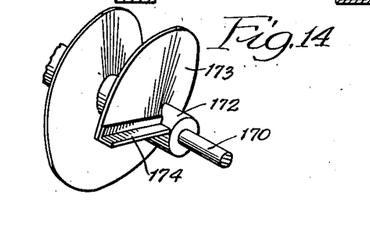
Fig. 14 is a detail in perspective of the delivery end of the unloading screw elsewhere shown in Fig. 13.

Referring now to Figs. 13 and 14, we have shown a modified unloader comprising a shaft 170 mounted to rotate transversely over the hearth at substantially the point where the treated material is to be removed therefrom, and equipped with a sprocket wheel 171 (or two, if desired) by which power may be conveniently transmitted thereto. Carried upon this shaft is a hub 172 mounting a large diameter screw 173 having the lower portion of each convolution in close proximity to the hearth so that, when operated, the loose material will be engaged thereby to be shifted transversely towards the outer hearth rim. At the outer end of the screw we have affixed a radial flange 174 extending outwardly close to the proximate rim of the hearth, adapted to act upon the loose material which may have collected at that point, first raising and then dropping the material upon a ledge 175 from which it descends along an inclined chute 176 to a discharge station (not shown).

The unloader illustrated in Fig. 15 is of the rotatable scroll type and occupies a position relative to the hearth the same as shown in Fig. 3. In this case, however, we affix to the interior of the scroll 180 a spiral ribbon 181 mounted to rotate therewith instead of independently thereof. Loose material caught by the hardened acting edge 182 of the scroll is raised thereby, then deposited within the inner convolution thereof to occupy the spaces between the convolutions of the ribbon, and while so positioned is moved horizontally through the passageway extending axially of the ribbon to a point of discharge exteriorly of the hearth.

Operation

The material to be treated is conveyed to the hopper or bin from which it is released for a controlled discharge into the distributing hood immediately over the hearth. As the hearth rotates it carries the material with it concentrically. It advances along with the hearth through nearly 360° of movement, returning to approximately its point of introduction. The material may remain on the hearth for one or more revolutions, the desirability of this depending upon various factors, such as temperature, nature of material, speed of rotation, etc. In the event that the material is to travel through more than one cycle of rotation, it may be desirable to slow down operation of the scoop or stop its operation at a point where its acting edge 150 is suspended in an elevated position.

Stirring of the ore is accomplished by the several rabble arms, which are spaced apart, as desired, each revolving horizontally on a vertical shaft whose axis remains stationary. The plows which are attached to the rabble arms may be variously positioned. It may be advantageous for the acting faces of all the plows on one arm to be angled in the same direction, the plows on the next adjacent arm to then be angled in a reverse direction. Also on the rabble arm nearest the distributing hood we prefer to affix but two widely spaced plows, each angled outwardly so as to promote an initial spreading and uniform distribution of the material transversely of the hearth at the commencement of its travel thereupon; and likewise on the rabble arm closest to the unloading mechanism it is desirable to angle the plows inwardly so as to concentrate the material toward the transverse center of the hearth in preparation for its handling by the unloader. It is thus possible to effect an initial spread, then a shift of the material first toward the one rim and then toward the other rim of the hearth, and finally toward its center. This is only one of several plans for controlling shift of the material during its treating cycle.

The combination of the rotating hearth traveling against the horizontally moving plows produces a slow, persistent turning over of the material on the hearth bed. The action is similar to that of a scroll. As shown, the rabble arms with plows are interconnected to rotate all in the same direction, but this scheme may be varied, if desired, to alternate the direction of rotation of the adjacent arms.

The constantly operating scoop may revolve at a comparatively slow speed, but even so its movement is fast in relation to the advance of the hearth whose rotary speed is desirably very slow. The material which is picked up by the hardened acting edge of the scoop travels around and toward its center where it is engaged by the screw conveyor whose operation, being independent of that of the scoop, may proceed at any desired speed. There is advantage in this because as a volume of material is accumulated in the scoop the screw can be run sufficiently faster to keep the center of the scoop clear, thereby leaving sufficient space for a new charge of material at each revolution of the scoop. By reason of this effective type of unloader, the material can be continually removed from the revolving hearth without any spillage over its rims.

*General observations*

The present apparatus is designed for a continuous roasting process. By reason of the flexible control which may be maintained over its several agencies, it is possible to vary (1) the rate at which the charge is deposited as well as removed from the hearth, (2) the manner in which the charge is operated upon by the several rabble mechanisms, (3) the time of heat treatment to which the charge is subjected, and also (4) the nature of the heat treatment by adjusting the burners to operate in any one of various ways. The temperature is of course subject to a control, but additionally the charge may be caused to advance successively through various zones of treatment, each unlike the others. For example, the burners may be so located, or be so operated, as to provide during the initial part of the ore movement a warming-up zone, thereafter a hot zone, and finally a cooling zone. As the hearth revolves, the charge passes through these various zones each of which is subject to individual control, as desired.

For the maintenance of direct flames in the annular chamber above the hearth, we may employ any of various fuels such as natural gas, artificial gas, propane, butane, fuel oil, producer gas, etc. When a radiant heat is used it is possible to maintain an atmosphere which is neutral, reducing, oxidizing, etc. For certain types of material which direct flames tend to overheat in spots, with a consequent fusion of low melting point products, the radiant type of heat is to be preferred. Under such conditions, because of the absence of blast, there is less of a tendency for the production of dust; but if merely an oxidizing atmosphere is desired, the open flame method of heating is suitable.

A close temperature control is also possible with the present apparatus. This is important because if temperatures be carried to an excess, physical changes will occur in the treated product. For example, in the case of an ore, if fusion takes place the gold and silver particles will acquire a film (apparently of a siliceous nature) which acts as an objectionable coating not easily penetrated by a solute, such as cyanide solution. Such a condition can be avoided by a close pyrometrical control of the heat, whether it be applied directly or indirectly.

Air or other desired gas required for the chemical reaction to roast the ore or other material may be admitted through the openings 58, to the correct number and size, which are formed in the side walls of the furnace. The products of combustion and chemical reactions may be removed from the chamber through the conduit 100 with the aid of a suction fan (not shown). Such a fan also has a secondary purpose in that it furnishes draft for supporting the combustion of the fuels in the burners. It is preferred that this fan be connected to the furnace chamber by means of a gas hood 185 located directly ahead of the loader. This hood is so constructed that it spreads across the width of the hearth and as close to the ore or other material as is practicably possible. During the process of roasting or heat treating of the ore, the products of combustion and of chemical reaction, such as sulphur dioxide, are drawn out of the furnace chamber concurrently with the introduction of fresh air through the openings in the walls thereof.

Stirring of the loose material, as the hearth revolves, is accomplished by the several rabble arms, spaced as desired, each revolving horizontally on a stationary vertical center shaft. The combination of the rotating hearth traveling against the rabble plows which move about in a horizontal plane causes a slow, quiet, but effective turning over of the material on the hearth bed, the action being similar to a scroll. New surfaces of the material are constantly brought up to the top for exposure to the treating atmosphere within the furnace.

In conclusion we would have it noted that in the present mechanism there is a positive movement of all the material, as it advances along upon the hearth bed, the material being finally returned to its original point of entry; the material may, if desired, be re-treated as many times as necessary by remaining upon the hearth during plural revolutions thereof; there is a thorough stirring of the material due to the unique movement occasioned by the rotatable advance of the hearth and the continuous rotary movement of the several rabble arms about fixed vertical axes; by employment of a rotary hearth an accurate temperature control is facilitated, permitting positive control of the treating time and maintenance of definite zones of treatment. Such a hearth, which advances through a rotary path, permits an absolute control of such factors as time, temperature, zoning and movement of the material particles. If radiant heat be employed, then the treating chamber very closely approaches a muffle type of furnace where it is possible to maintain uniform roasting conditions with a minimum of blowing or dusting. Also by the employment of a radiant heat produced in an annular tunnel through which the rotating hearth advances, there is a greater uniformity in roasting chemically because of avoidance of hot or cold spots, fusion of particles due to extreme temperature, and over-treating of minute particles due to direct contact of such particles with the flame.

We claim:

1. A treating mechanism in which is comprised an annular hearth, means for supporting the hearth for rotation about a fixed axis, a stationary annular roof above the hearth, walls supporting the roof extending downwardly adjacent the inner and outer rims of the hearth in spaced relation thereto, a partition extending transversely through the chamber between the hearth, the roof and the supporting walls and dividing the hearth into separate zones, and a fluid seal between the hearth rims and the partition and said walls, said partition being provided at the bottom with an apron fitting closely within the hearth and extending over the rims thereof and downwardly therebelow into the fluid seal.

2. A treating mechanism in which is comprised an annular hearth, means for supporting the hearth for rotation about a fixed axis, an endless chain below the hearth in proximity thereto, spaced wheels over which the chain is trained, means for driving the chain, a guide for one run of the chain adapted to direct its travel through an arc concentric with the hearth, and interengaging means on the chain and hearth adapted to transmit motion from the former to the latter.

3. A treating mechanism in which is comprised an annular hearth, means supporting the hearth for rotation about a fixed axis, a stationary annular roof supported above the hearth, a plurality of shafts extending vertically through the roof each mounted for rotation, a rabble arm carried by each shaft adjacent the hearth bed, means located centrally of the treating mechanism for transmitting concurrent motion to all the shafts from a common power source, and means independent of the transmission for rotating the hearth.

4. A treating mechanism in which is comprised an annular hearth mounted for rotation about a fixed axis, a stationary annular roof supported above the hearth, a partition extending transversely through the chamber above the hearth and dividing the hearth into separate zones, means for discharging material transversely across the hearth at a point adjacent one side of the partition and for delivering a greater quantity of material at one side of the hearth than at the other, means for removing material from the hearth at a point adjacent the opposite side of the partition, and means for rotating the hearth.

5. A treating mechanism in which is comprised an annular hearth mounted for rotation about a fixed axis, a stationary annular roof supported above the hearth, a partition extending transversely across the chamber above the hearth and dividing the hearth into separate zones, means for discharging material to be treated transversely across the hearth at a point adjacent one side of the partition wall and for delivering a greater quantity of material at the outer side of the hearth than at the inner side, means for delivering heat into the annular chamber above the hearth through a desired portion of its circular extent whereby the material advanced therethrough is heat treated, and means adjacent the opposite side of the partition adapted to remove the treated material from the hearth.

6. A treating mechanism in which is comprised an annular hearth adapted for rotation about a fixed axis, a stationary annular roof above the hearth, walls supporting the roof extending downwardly adjacent the hearth in spaced relation thereto, means providing a fluid seal between the walls and the hearth whereby a closed chamber is provided, a plurality of rabble devices arranged at intervals around the hearth each mounted for rotation through a horizontal plane at a point slightly above the bed of the hearth, means for rotating the hearth and means extending radially from a point centrally of the treating mechanism for rotating the several rabble devices whereby loose material upon the hearth bed, advanced thereby through a circular path, is stirred concurrently by the several rabble devices.

7. A treating mechanism in which is comprised an annular hearth mounted for rotation about a fixed axis, and means for removing from the hearth bed loose material carried thereon comprising a spiral scoop extended transversely over the hearth and having an outer scooping edge extending substantially across the hearth in combination with a screw conveyor within the scoop, and means for rotating the spiral scoop and the screw conveyor whereby the outer acting scoop edge upon swinging through loose material on the hearth bed is adapted to lift the material toward the screw conveyor for horizontal movement thereby to a point of discharge remote from the hearth.

8. A treating mechanism in which is comprised an annular hearth mounted for rotation about a fixed axis, and means for removing from the hearth bed loose material carried thereon comprising a rotatable spiral scoop extending transversely across the hearth with the outer acting scoop edge adapted to swing close to the hearth bed to lift the material therefrom, means for horizontally conveying to a point of discharge the material lifted by the scoop, power means for operating the scoop, and control means adapted to halt the scoop operation at any desired point, whereby with the outer acting edge thereof held in an elevated position a clearance is provided to permit material remaining on the hearth bed to pass thereunder.

9. A treating mechanism in which is comprised an annular hearth mounted for rotation about a fixed axis, and means for removing loose material from off the hearth bed comprising a spiral scoop extended transversely thereacross and mounted for rotation in a manner whereby the acting outer scoop edge may swing through the material on the hearth to lift the same, a screw conveyor extended centrally through the spiral scoop, means affording a rotatable mounting for the scoop and another rotatable mounting concentric therewith for the conveyor, and means for operating the scoop and conveyor independently whereby the rate of movement of each may be separately controlled.

10. A treating mechanism in which is comprised an annular hearth mounted for rotation about a fixed axis, a stationary annular roof supported above the hearth, a plurality of shafts arranged in an annular series around the hearth and mounted for rotation extended vertically through the hearth roof, a rabble arm carried at the lower end of each shaft adapted to swing through a horizontal plane close to the hearth bed, a plurality of plows carried by each arm extending downwardly for engagement with material carried on the hearth bed and arranged for continuously agitating, turning over and moving the loose material crosswise of the hearth back and forth from one side to the other thereof during the travel of the loose material from a starting point to a finishing point so as to subject to treatment in the furnace the material on the hearth bed at places close to and removed from points where a treating medium is introduced, whereby the material will be subjected to every kind of condition which exists within the furnace.

11. A treating mechanism in which is comprised an annular hearth mounted for rotation about a fixed axis, a stationary annular roof supported above the hearth, a plurality of shafts arranged in an annular series around the hearth and mounted for rotation extended vertically through the hearth roof, means for continuously agitating, turning over and moving the loose material crosswise of the hearth back and forth from one side to the other thereof during the travel of the loose material from a starting point to a finishing point so as to subject to treatment in the furnace the material on the hearth bed at places close to and removed from points where a treating medium is introduced whereby the material will be subjected to every kind of condition which exists within the closed furnace, said stirring means including a rabble arm carried at the lower end of each shaft adapted to swing through a horizontal plane close to the hearth bed, and a plurality of plows carried by each arm extending downwardly for engagement with material carried on the hearth bed, each plow comprising a blade angularly disposed with respect to the supporting arm.

12. A treating mechanism in which is comprised an annular hearth mounted for rotation about a fixed axis, a stationary annular roof supported above the hearth, a plurality of shafts arranged in an annular series around the hearth and mounted for rotation extended vertically through the hearth roof, means for continuously agitating, turning over and moving the loose material crosswise of the hearth back and forth from one side to the other thereof during the travel of the loose material from a starting point to a finishing point so as to subject to treatment in the furnace the material on the hearth bed at places close to and removed from points where a treating medium is introduced whereby the material will be subjected to every kind of condition which exists within the closed furnace, said stirring means including a rabble arm carried at the lower end of each shaft adapted to swing through a horizontal plane close to the hearth bed, and a plurality of plows carried by each arm extending downwardly for engagement with material carried on the hearth bed, each plow comprising a blade and a bracing web in angular relation to the arm.

13. A treating mechanism in which is comprised an annular hearth mounted for rotation about a fixed axis, a stationary annular roof above the hearth, means for delivering loose material upon the hearth comprising a chute and a hood adjustably supported at the lower end of the chute, the hood being formed to extend transversely across the hearth and being provided internally with inner and outer baffles against which material passing through the hood is adapted to strike for deflection to points adjacent opposite rims of the hearth, the outer baffle being disposed a greater distance from the adjacent wall of the hood than the inner baffle in relation to the hood, thereby assuring a larger flow of material to the hearth adjacent its outer rim with a more even distribution of the material.

14. A treating mechanism in which is comprised an annular hearth, means supporting the hearth for rotation about a fixed axis, a stationary annular roof supported above the hearth, means for delivering continuously upon the hearth a quantity of loose material, means for removing continuously from the hearth the loose material thereon after nearly 360° of hearth rotation, means for spreading the material transversely of the hearth at a point initially of its travel thereupon, rotary means arranged at intervals around the hearth for continually stirring the material during its travel in response to rotation of the hearth, and means adjacent the removal point for concentrating the material toward the transverse center of the hearth preliminary to removal of the material from the hearth.

15. A treating mechanism in which is comprised an annular hearth mounted for rotation about a fixed axis, a stationary annular roof supported above the hearth, means for continuously delivering loose material upon the hearth, a plurality of stirring mechanisms disposed radially above the hearth each comprising a screw adapted at the lowermost point of each convolution to engage with the material whereby to move the same toward one rim of the hearth, said screws being reversely arranged to move the material back and forth across the hearth, and means for rotating the several screws.

16. A treating mechanism in which is comprised an annular hearth mounted for rotation about a fixed axis, a stationary annular roof supported above the hearth, and means for discharging material transversely across the hearth comprising a scroll mounted for rotation about a horizontal axis disposed radially of the hearth at a point thereabove sufficient to permit the outer scroll edge to swing close to the hearth to pick up loose material thereon, said scroll having its outer scooping edge extending substantially across the hearth, and a spiral ribbon concentric with the scroll axis fitted therewithin and adapted to be rotated thereby, there being a continuous passageway transversely of the scroll whereby loose material raised thereby is delivered to the spiral ribbon to be advanced thereby lengthwise of the scroll to a point of discharge remote from the hearth.

17. A treating mechanism in which is comprised a traveling hearth adapted, when loose material is deposited on it, to convey said loose material a predetermined distance from a starting point to a finishing point, walls and a roof defining a closed chamber in which the hearth is moved, means for continuously feeding loose material upon the hearth bed at the starting point, means for continuously removing loose material from the hearth bed at the finishing point, means for introducing through openings in one or more walls of said chamber at selected portions of the travel of the material a treating medium, and means contained in said closed chamber for continuously agitating, turning over and moving the loose material crosswise of the hearth back and forth from one side to the other thereof during the travel of the loose material between the starting point and the finishing point so as to subject to treatment in the chamber the material on the hearth bed at places close to and removed from the points where the medium is introduced whereby the material will be subjected to every kind of condition which exists within the closed chamber.

18. A treating mechanism in which is comprised an annular hearth adapted for rotation about a fixed axis, a stationary annular roof above the hearth, walls supporting the roof extending downwardly adjacent the hearth in spaced relation thereto, said roof and walls defining a closed chamber in which the hearth is moved, means for continuously feeding loose material upon the hearth bed at a starting point, means for continuously removing loose material from the hearth bed at a finishing point after a predetermined number of degrees of hearth rotation, means for introducing through openings in one or more walls of said chamber at selected portions of the travel of the material a treating medium, and means contained in said closed chamber for continuously agitating, turning over and moving the loose material crosswise of the hearth back and forth from one side to the other thereof during the travel of the loose material between the starting point and the finishing point so as to subject to treatment in the chamber the material on the hearth bed at places close to and removed from the points where the medium is introduced whereby the material will be subjected to every kind of condition which exists within the closed chamber.

19. A treating mechanism in which is comprised an annular hearth adapted for rotation about a fixed axis, a stationary annular roof above the hearth, walls supporting the roof extending downwardly adjacent the hearth in spaced relation thereto, said roof and walls defining a closed chamber in which the hearth is moved, means providing a fluid seal between the walls and the hearth, a plurality of rabble devices operable in a horizontal plane slightly above the bed of the hearth adapted to move loose material supported thereon, means for rotating the hearth, and means for operating the several rabble devices, said rabble devices being contained within said closed chamber and arranged for continuously agitating, turning over and moving the loose material crosswise of the hearth back and forth from one side to the other thereof during the travel of the loose material between the starting point and the finishing point so as to subject to treatment in said closed chamber the material on the hearth bed at places close to and removed from points where the medium is introduced whereby the material will be subjected to every kind of condition which exists within the closed chamber.

20. A treating mechanism in which is comprised an annular hearth, means supporting the hearth for rotation about a fixed axis, a stationary annular roof, walls supporting the roof, said walls and roof defining a closed chamber in which the hearth is moved, means for delivering continuously upon the hearth at a starting point a quantity of loose material, means for removing continuously from the hearth the loose material thereon at a finishing point after nearly 360° of hearth rotation, means for introducing through openings in one or more walls of said chamber at selected portions of the travel of the material a treating medium, and means contained in said closed chamber for continuously agitating, turning over and moving the loose material crosswise of the hearth back and forth from one side to the other thereof during the travel of the loose material between the starting point and the finishing point so as to subject to treatment in the chamber the material on the hearth bed at places close to and removed from the points where the medium is introduced, whereby the material will be subjected to every kind of condition which exists within the closed chamber.

OLIVER D. COLLIS.
ELDRED C. BRACE.
EMERY O. THOMPSON.